Sept. 7, 1926.
F. A. JIMERSON
1,599,364
CLOSE QUARTER DRILL
Filed May 2, 1925
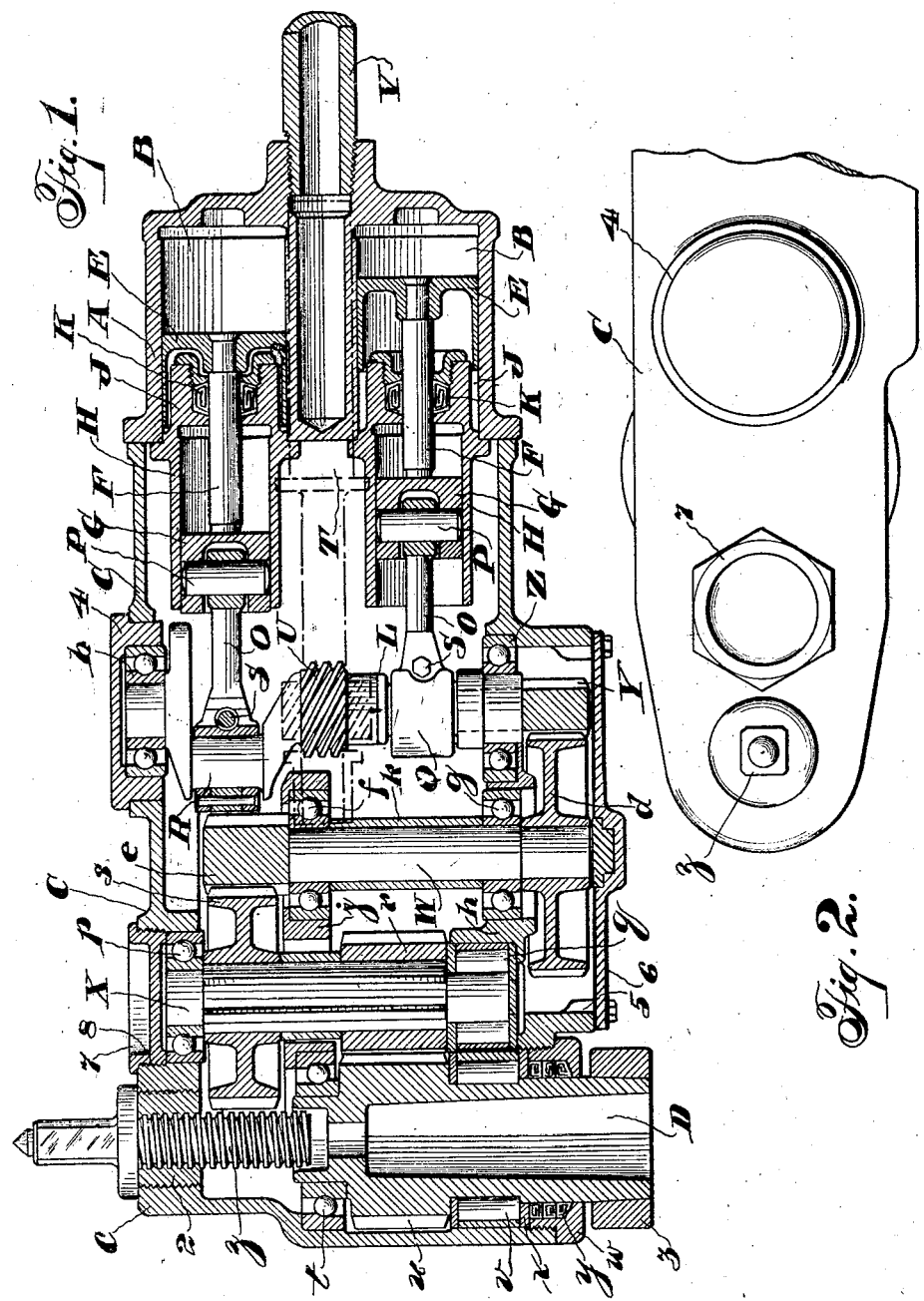
INVENTOR
*Francis A. Jimerson*
BY
*Herbert G. Ogden*
HIS ATTORNEY Patented Sept. 7, 1926.

1,599,364

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

CLOSE-QUARTER DRILL.

Application filed May 2, 1925. Serial No. 27,417.

This invention relates to pneumatic rotary drills, and more particularly to a drill for operating in close quarters where the member to be turned is close to other members providing little clearance.

One object of the invention is to construct a drill having a large gear reduction occupying relatively little space. Another object of the invention is to arrange the parts of a drill of this character so that they may be easily removed and put together.

Other objects and advantages of the invention will be in part obvious and in part pointed out hereinafter.

In the drawing forming part of the specification and in which similar reference characters refer to similar parts, Figure 1 is a longitudinal vertical section through a close quarter drill constructed in accordance with the practice of the invention, and Figure 2 is a top view of the drill.

Referring to the drawing, the drill is provided with a casing in two parts, the part A being provided with a pair of cylinders B which may be formed integrally therewith and the casing part C being adapted to house suitable reduction gearing and shafts therefore for driving the spindle D. The cylinders B form part of a cylinder motor provided with double acting pistons E adapted to reciprocate within the cylinders B and connected to piston rods F rigidly attached to cross heads G sliding in cylindrical guides H formed integrally with the cylinder front heads J. Suitable packing K is provided in the front heads J for the piston rods F. The motor is arranged so that the pistons E and piston rods F reciprocate longitudinally within the casing A and are adapted to drive a transversely disposed crank shaft L by means of connecting rods O attached to the cross heads G by means of pins P loosely mounted in the cross heads and held against removal by the guides H. The crank end of the connecting rod O is provided with suitable bearings and may be constructed with hinged parts Q adapted to swing about the pins R and normally bolted about the crank pins by means of bolts S. The distribution of air to the cylinders B may be effected by means of a rotary valve T shown in dotted lines, actuated by a spiral gear U on the drive shaft L. Air may be admitted to the valve T through the handle V.

To provide sufficient power for driving the spindle D reduction gears are mounted on main counter shafts W and X interposed between the drive shaft L and the spindle D. Close quarter drills are used for exceptionally heavy work, such as tightening large bolts and drilling and reaming large diameter holes and it is desirable to provide great gear reduction for the spindle. Ordinarily, it is not essential that the spindle turn at high speed. By this invention it is proposed to provide each of the counter shafts W and X with large reduction gears without materially lengthening the casing C. To this end the main counter shaft is geared to the drive shaft by means of a pinion Y mounted on one end of the drive shaft L outside the anti-friction bearings Z and b meshing with a gear d mounted at one end of the main counter shaft W. At the other end of the counter shaft W there is provided a pinion e which may be formed integrally with the counter shaft. Intermediate the gear d and the pinion e there is provided a pair of anti-friction bearings f and g mounted in suitable supports h and j formed integrally with the casing C. The anti-friction bearings f and g are held in spaced relation by a sleeve k loosely mounted on the main counter shaft W.

The second counter shaft X is provided with anti-friction bearings p and q, the latter being preferably of the roller type, since close to this bearing there is provided a driving pinoin r which transmits power to the spindle D. Near the upper anti-friction bearing p the counter shaft X is provided with a gear s meshing with the pinion e. In drills of this type heretofore constructed, the spindle D has been long extending substantially the width of the casing C. This has necessitated a small gear corresponding to the gear s. However, in accordance with the practice of this invention, the spindle D is made substantially shorter than the width of the casing C so as to accommodate a large gear s thereby providing a large gear reduction from the main counter shaft W to the second counter shaft X. The spindle therefore extends into the casing parallel to the counter shaft and below the gear s on the counter shaft. An anti-friction thrust bearing t for radial and axial loads of the spindle D is mounted in the casing C below the gear s and fits about a reduced end of the spindle D.

Because of the great reduction in speed and greatly increased torque transmitted to the spindle D from the motor, the pinion r is preferably of relatively great width to withstand the high tooth pressure transmitted to the gear u preferably formed integrally with the spindle D. Strength and rigidity are imparted to the spindle D by locating a radial thrust anti-friction roller bearing v and the radial and the axial thrust bearing t on opposite sides of the gear u. The spindle is held in position by a nut w bearing against a washer x between the nut and the bearing v. The nut w may act also as a gland to compress suitable packing y about the spindle D.

If desired, a simple feed screw z may be provided in alignment with the spindle D. The feed screw z being of relatively small diameter with respect to the spindle D will not interfere with the gear s adjacent. A nut 2 for the feed screw z may be screwed into the wall of the casing C.

The portion A of the casing may be readily removed from the portion C by loosening the fastening means (not shown) therebetween. To remove the pistons and connecting rods, the bolts S are removed and the bearings Q opened, whereupon the portion A with the cylinders B, pistons E and connecting rods O are withdrawn from the end of the casing C. A cap 4 is provided in the casing C to support the bearing b, the cap being removable from the casing and permitting the crank shaft L to be withdrawn through the opening which the cap 4 closes. On the opposite side of the casing C there is provided a large aperture 5 through which the main counter shaft W may be withdrawn when the cover 6 therefor is removed. The cover 6 prevents axial movement of the counter shaft W with respect to its bearings f and g. In order to remove the counter shaft X there is provided a cap 7 screwed into an aperture 8 in the casing on the side opposite the opening 5. The counter shaft X is splined to engage the pinion r and the gear s and may be withdrawn through the aperture 8 leaving the pinion r and gear s in position. Said gear and said pinion may be removed after the counter shaft X through the opening (at the end of the casing C where portion A normally joins).

The arrangement above described is easily disassembled and assembled and is compactly arranged within the casing C. In addition to these features of advantage, the gear reduction from the drive shaft L to the spindle D is large without sacrificing strength of the parts or proper bearing support for the spindle or the counter shafts.

I claim:

1. A close quarter drill comprising a casing, a cylinder motor arranged longitudinally within the casing and having a transversely disposed drive shaft, a pinion at one end of said drive shaft and anti-friction bearings at the other end of said drive shaft, an anti-friction bearing adjacent said pinion, a main counter shaft having a gear at one end meshing with the pinion on said drive shaft and a pinion at its other end and anti-friction bearings disposed between said gear and said pinion on the main counter shaft, a second counter shaft having a gear meshing with the pinion on said main counter shaft, anti-friction bearings at the ends of said second counter shaft, a spindle extending into said casing below the gear on said second counter shaft and having a bearing therebelow, and a pinion on said spindle between the gear on the second counter shaft and the lower anti-friction bearing for said second counter shaft.

2. A close quarter drill comprising a casing, a cylinder motor arranged longitudinally within the casing and having a transversely disposed drive shaft, a pinion at one end of said drive shaft and anti-friction bearings at the other end of said drive shaft, an anti-friction bearing adjacent said pinion, a main counter shaft having a gear at one end meshing with the pinion on said drive shaft and a pinion at its other end and anti-friction bearings disposed between said gear and said pinion on the main counter shaft, a second counter shaft having a gear meshing with the pinion on said main counter shaft, a spindle extending into said casing below the gear on said second counter shaft and having a bearing therebelow, pinions on said spindle between the gear on the second counter shaft and the lower anti-friction bearing for said second counter shaft, and a feed screw extending into said casing opposite the spindle and adjacent the gear on said second counter shaft.

In testimony whereof I have signed this specification.

FRANCIS A. JIMERSON.